United States Patent
Solomon et al.

(10) Patent No.: US 7,130,966 B2
(45) Date of Patent: Oct. 31, 2006

(54) POWER REDUCTION FOR PROCESSOR FRONT-END BY CACHING DECODED INSTRUCTIONS

(75) Inventors: Baruch Solomon, Zichron Yaakov (IL); Ronny Ronen, Haifa (IL); Doron Orenstien, Haifa (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 11/217,474

(22) Filed: Sep. 2, 2005

(65) Prior Publication Data

US 2006/0053245 A1 Mar. 9, 2006

Related U.S. Application Data

(62) Division of application No. 09/892,566, filed on Jun. 28, 2001, now Pat. No. 6,950,903.

(51) Int. Cl.
G06F 12/08 (2006.01)
G06F 1/32 (2006.01)
(52) U.S. Cl. .................. 711/125; 711/119; 711/122
(58) Field of Classification Search .............. None
See application file for complete search history.

(56) References Cited

U.S. PATENT DOCUMENTS

| 4,575,814 | A | 3/1986 | Brooks, Jr. et al. |
|---|---|---|---|
| 5,381,533 | A | 1/1995 | Peleg et al. |
| 5,461,699 | A | 10/1995 | Arbabi et al. |
| 5,889,999 | A | 3/1999 | Breternitz, Jr. et al. |
| 5,913,223 | A | 6/1999 | Sheppard et al. |
| 5,924,092 | A | 7/1999 | Johnson |
| 5,966,541 | A | 10/1999 | Agarwal |
| 5,974,538 | A | 10/1999 | Wilmot, II |
| 6,073,213 | A | 6/2000 | Peled et al. |
| 6,076,144 | A | * 6/2000 | Peled et al. .................. 711/125 |
| 6,185,675 | B1 | 2/2001 | Kranich et al. |
| 6,189,140 | B1 | 2/2001 | Madduri |
| 6,205,518 | B1 | * 3/2001 | Moore et al. ............... 711/118 |
| 6,216,200 | B1 | 4/2001 | Yeager |
| 6,233,678 | B1 | 5/2001 | Bala |
| 6,279,103 | B1 | 8/2001 | Warren |
| 6,339,822 | B1 | 1/2002 | Miller |
| 6,351,844 | B1 | 2/2002 | Bala |
| 6,427,188 | B1 | 7/2002 | Lyon et al. |
| 6,460,116 | B1 | * 10/2002 | Mahalingaiah ............... 711/125 |
| 6,507,921 | B1 | 1/2003 | Buser et al. |
| 6,535,959 | B1 | 3/2003 | Ramprasad et al. |

OTHER PUBLICATIONS

Conte et al, "Optimization of Instruction Fetch Mechanisms for High Issue Rates," *Proceedings of the 22nd Annual Int'l. Symposium on Computer Architecture*, Jun. 22-24, 1995, Santa Margherita Ligure, Italy, pp. 333-344.

(Continued)

*Primary Examiner*—Gary Portka
(74) *Attorney, Agent, or Firm*—Kenyon & Kenyon LLP

(57) ABSTRACT

A power aware front-end unit for a processor may include a UOP cache that disables other circuitry within the front-end unit. In an embodiment, a front-end unit may disable instruction synchronization circuitry, instruction decode circuitry and, optionally, instruction fetch circuitry while instruction look-ups are underway in both a block cache and an instruction cache. If the instruction look-up indicates a miss, the disabled circuitry thereafter may be enabled.

9 Claims, 4 Drawing Sheets

OTHER PUBLICATIONS

Dutta et al, "Control Flow Prediction with Tree-Like Subgraphs for Superscalar Processors," *Proceedings of the 28th Int'l. Symposium on Microarchitecture*, Nov. 29-Dec. 1, 1995, Ann Arbor, MI, pp. 258-263.

Hennessy et al., *Computer Organization and Design: the hardware/software interface*, 2nd Edition, Morgan Kaufmann Publishers, San Francisco, CA, 1998, p. 570.

Johnson, Mike, *Superscalar Microprocessor Design*, PTR Prentice-Hall, Englewood Cliffs, New Jersey, 1991, Chapter 10, pp. 177-202.

Jourdan et al, "eXtended Block Cache," Intel Corporation, Intel Israel, Haifa, 31015, Israel, pp. 1-10.

McFarling, Scott, "Combining Branch Predictors," Jun. 1993, WRL Technical Note TN-36, Digital Western Research Laboratory, Palo Alto, CA, 25 pp.

Mischaud et al, "Exploring Instruction-Fetch Bandwidth Requirement in Wide-Issue Superscalar Processors," *Proceedings of the 1999 Int'l. Conference on Parallel Architectures and Compilation Techniques*, Oct. 12-16, 1999, Newport Beach, CA, pp. 2-10.

Patel et al, "Improving Trace Cache Effectiveness with Branch Promotion and Trace Packing," *Proceedings of the 25th Annual Int'l. Symposium on Computer Architecture*, Jun. 27-Jul. 1, 1998, Barcelona, Spain, pp. 262-271.

Reinman et al, "A Scalable Front-End Architecture for Fast Instruction Delivery," *Proceedings of the 26th Int'l. Symposium on Computer Architecture*, May 2-4, 1999, Atlanta, GA, pp. 234-245.

Rotenberg et al, "Trace Processors," *Proceedings of 30th Annual IEEE/ACM International Symposium on Microarchitecture*, Dec. 1, 1997, Research Triangle Park, NC, pp. 138-148.

Seznec et al, "Multiple-Block Ahead Branch Predictors," *Proceedings of the 7th Int'l. Conference on Architectural Support for Programming Languages and Operating Systems*, Oct. 1-4, 1996, Cambridge, MA, pp. 116-127.

Yeh et al, "Increasing the Instruction Fetch Rate via Multiple Branch Prediction and a Branch Address Cache," *Proceedings of the 7th Int'l. Conference on Supercomputing*, Jul. 1993, Tokyo, Japan, pp. 67-76.

Jordan et al, "eXtended Block Cache", *Proceedings of Int'l Symposium on High Performance Computer Architecture*, pp. 1-10, Jan. 2000.

Bellas et al, "Architectural and Compiler Techniques for Engery Reduction in High Performance Microprocessors", *IEEE Transactions on VLSI*, vol. 8, No. 3, Jun. 2000.

Black et al, "The Block-Based Trace Cache", Proceedings of the 26th Intl. Symposium on Computer Architecture, IEEE Computer Society TCCA, ACM, SIGARCH, Atlanta, Georgia, May 2-4, 1999.

Friendly et al, "Alternative Fetch and Issue Policies for the Trace Cache Fetch Mechanism", 30th Annual IEEE/ACM Intl. Symposium on Microarchitecture, Research Triangle Park, North Carolina, Dec. 1-3, 1997.

Intrater et al, "Performance Evaluation of a Decoded Instruction Cache for Variable Instruction-Length Computers", 19th Annual Intl. Symposium on Computer Architecture, Gold Coast, Australia, May 19-21, 1992.

Jacobson et al, "Path-Based Next Trace Prediction", 30th Annual IEEE/ACM Intl. Symposium on Microarchitecture, Research Triangle Park, North Carolina, Dec. 1-3, 1997.

Manne et al, "Pipeline Gating: Speculation Control for Engery Reduction", Proceedings, 25th Annual Intl. Symposium on Computer Architecture, IEEE Computer Society Tech. Comm. on Computer Architecture, ACM SIGARCH, Barcelona, Spain, Jun. 27-Jul. 1, 1998.

Glaskowsky, Peter N., "Pentium 4 (Partially) Previewed", *Microprocessor Report*, vol. 14, Archive 8, pp. 1, 11-13, Aug. 2000.

Papworth, David B., "Tuning the Pentium Pro Microarchitecture", *IEEE Micro*, IEEE Computer Society, vol. 16, No. 2, Apr. 1996.

Upton, Michael, "The Intel Pentium® 4 Processor", http://www.intel.com/pentium4, Oct. 2000.

Rotenberg et al, "Trace Cache: A Low Latency Approach to High Bandwidth Instruction Fetching", Proceedings, 29th Annual IEEE/ACM Intl. Symposium on Microarchitecture, MICRO-29, IEEE Computer Society Tech. Comm. on Microprogramming and Microarchitecture, Assn. for Computing Machinery SIGMICRO, Paris, France, Dec. 2-4, 1996.

Solomon et al., "Micro-Operation Cache: A Power Aware Frontend for Variable Instruction Length ISA", ISLPED'01, Aug. 6-7, 2001.

\* cited by examiner

200

300

400

(a)

(b)

(c)

600

700

POWER REDUCTION FOR PROCESSOR FRONT-END BY CACHING DECODED INSTRUCTIONS

CROSS-REFERENCE TO RELATED APPLICATION

This application is a divisional application of application Ser. No. 09/892,566, filed Jun. 28, 2001, now U.S. Pat. No. 6,950,903. The contents of application Ser. No. 09/892,566 are incorporated herein by reference.

BACKGROUND

FIG. 1 is a block diagram illustrating the process of program execution in a conventional processor. Program execution may include three stages: front end 110, execution 120 and memory 130. The front-end stage 110 performs instruction pre-processing. Front end processing 110 typically is designed with the goal of supplying valid decoded instructions to an execution core with low latency and high bandwidth. Front-end processing 110 can include branch prediction, decoding and renaming. As the name implies, the execution stage 120 performs instruction execution. The execution stage 120 typically communicates with a memory 130 to operate upon data stored therein.

FIG. 2 illustrates high-level processes that may occur in front-end processing. A front-end may store instructions in a memory, called an "instruction cache" 140. A variety of different instruction formats and storage schemes are known. In the more complex embodiment, instructions may have variable lengths (say, from 1 to 16 bytes in length) and they need not be aligned to any byte location in a cache line. Thus, a first stage of instruction decoding may involve instruction synchronization 150—identifying the locations and lengths of each instruction found in a line from the instruction cache. Instruction synchronization typically determines the location at which a first instruction begins and determines the location of other instructions iteratively, by determining the length of a current instruction and identifying the start of a subsequent instruction at the next byte following the conclusion of the current instruction. Once the instruction synchronization is completed, an instruction decoder 160 may generate micro-instructions from the instructions. These micro-instructions, also known as "uops," may be provided to the execution unit 120 for execution.

The process of instruction synchronization and instruction decoding can be a time-consuming process. And, because many program instructions are executed repeatedly during processor operation, many modern processors also include UOP caches 170. The UOP cache 170 may store decoded uops in "blocks" for later use. If program flow returns to an instruction sequence and corresponding uops are present in UOP cache 170, the UOP cache 170 may furnish the uops directly to the execution unit 120. Thus, UOP caches 170 are known to improve performance of front-end processing.

Various techniques are known for improving the throughput of front-end units 110. These techniques consume tremendous amounts of power. Implementation of a block cache, for example, requires power for the block cache itself. It also requires use of circuitry to observe decoded instructions from the instruction decoder, to build blocks, to detect block end conditions and to store the blocks in the block cache. The block cache must be integrated with other front-end components, such as one or more branch predictors. And, of course, as implementation of blocks becomes more complex, for example, to employ concepts of traces or extended blocks, the power consumed by the circuits that implement them also may increase. The front-end of the IA-32 processors consumes about 28% of the overall processor power.

As mobile computing applications and others have evolved, raw processor performance no longer is the paramount consideration for processor designs. Modern designs endeavor to provide maximize processor performance within a given power envelope. Given the considerable amount of power spent in front-end processing, the inventors perceived a need in the art for a front end unit that employed power control techniques. It is believed that such front end units are unknown in the art.

DETAILED DESCRIPTION

Embodiments of the present invention provide a power aware front-end unit for a processor. In an embodiment, a front-end unit may disable instruction synchronization circuitry, instruction decode circuitry and, optionally, instruction fetch circuitry while instruction look-ups are underway in both a UOP cache and an instruction cache. If the instruction look-up indicates a miss in the UOP cache, the disabled circuitry thereafter may be enabled.

Figure 3:
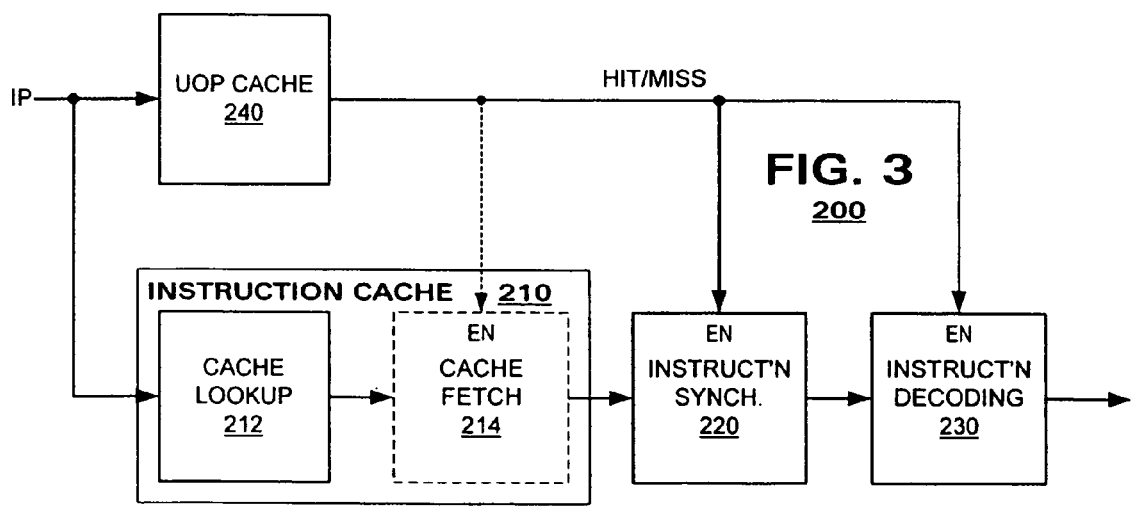
FIG. 3 illustrates a block diagram of a front-end unit according to an embodiment of the present invention.

FIG. 3 illustrates a block diagram of a front-end unit 200 according to an embodiment of the present invention. The front-end unit 200 may include an instruction cache 210, an instruction synchronizer 220, an instruction decoder 230 and a UOP cache 240. In the embodiment of the present invention, a HIT/MISS output from the UOP cache 240 may control operation of the instruction synchronizer 220 and instruction decoder 230. When the UOP cache generates an output indicating a hit, the instruction synchronizer 220 and the instruction decoder 230 may be disabled. When the UOP cache 240 indicates a miss, the instruction synchronizer 220 and the instruction decoder 230 may be enabled. Circuitry may be disabled by gating system clock signals to the instruction synchronizer 220 and instruction decoder 230 based on the state of the HIT/MISS output from the UOP cache 240.

In another embodiment, circuitry within the instruction cache 210 itself may be disabled by the HIT/MISS output from the UOP cache 240. As is known, operation of a typical cache occurs in two phases. First, a lookup operation is performed to determine if requested data is present in the cache (shown schematically as cache lookup 212). Second, if the data is present in the cache, a data fetch operation is performed (shown as cache fetch 214). Traditionally, cache lookups and data retrieval occurred as simultaneous operations. In an embodiment, cache fetch circuitry 214 within the instruction cache 210 may be disabled based on the status of the HIT/MISS output from the UOP cache 240. When the UOP cache indicates a hit, the cache fetch circuitry 214 may be disabled; when the UOP cache 240 indicates a miss, the cache fetch circuitry 214 may be enabled.

The foregoing embodiments provide for power conservation in a front-end unit by disabling circuitry that will not be used to decode instructions. During operation, a lookup operation may be performed at both the UOP cache 240 and the instruction cache 210 using an instruction address (often called an "instruction pointer" or "IP"). If the UOP cache 240 indicates a hit, the UOP cache 240 stores a block of uops corresponding to the instruction at the IP. Thus, even if the instruction cache 210 stores instructions at the IP, these instructions need not be decoded because decoded uops will be furnished from the UOP cache 240. The response of the UOP cache 240, therefore, may control this circuitry to conserve power.

Figure 1:
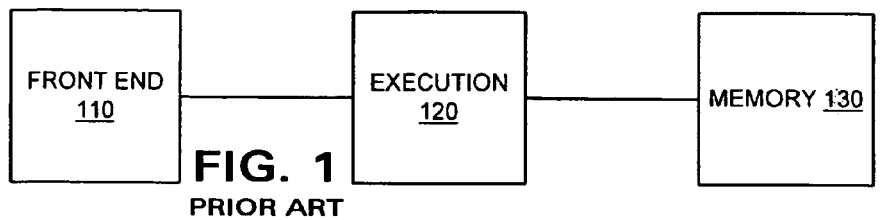
FIG. 1 is a block diagram illustrating the process of program execution in a conventional processor.
Figure 2:
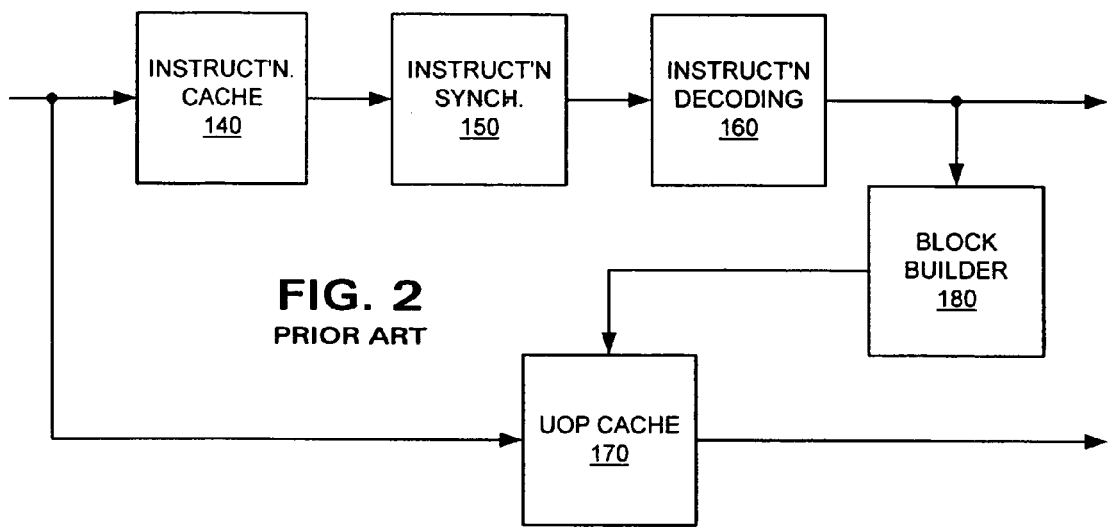
FIG. 2 illustrates high-level processes that may occur in front-end processing.

Returning to the embodiment illustrated in FIG. 2, if an IP hits the UOP cache 170 in a first cycle, the UOP cache 170 may furnish data to the execution unit in the very next cycle. By contrast, if the IP misses the UOP cache 170 but hits the instruction cache 140, instructions would not be available for execution until they have passed through the instruction synchronization and instruction decoding processes, a process that may occupy three cycles. The dual path architecture of FIG. 2 introduces a timing differential into many traditional front-end systems. This differential can be beneficial—if decoded uops are present in a UOP cache 170, the uops may be executed without incurring the latency of synchronization and decoding. Accordingly, many front-end systems employ additional circuitry (not shown in FIG. 2) to recognize and exploit conditional timing relationships. The additional circuitry, however, consumes power that in certain applications can be wasteful.

Figure 4:
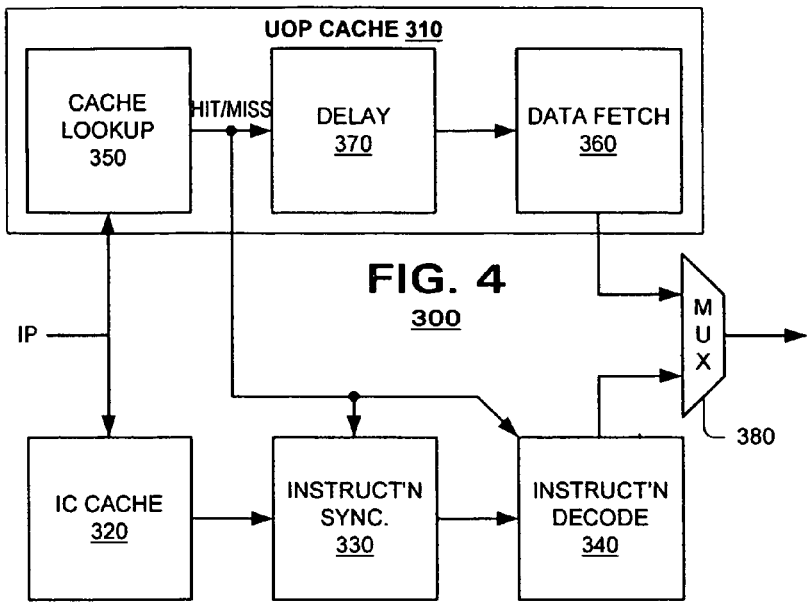
FIG. 4 illustrates an embodiment of a front-end system according to an embodiment of the present invention.

FIG. 4 illustrates an embodiment of a front-end system 300 according to an embodiment of the present invention. The system 300 may include a UOP cache 310, an instruction cache 320, an instruction synchronizer 330 and an instruction decoder 340. The UOP cache 310 functionally may include circuitry devoted to cache lookup functions 350 and to data fetch operations 360. In this regard, the operation of a front-end system is well known.

According to an embodiment, the UOP cache 310 may include a delay path 370 between the cache lookup 350 and data fetch 360 units. This embodiment finds application in designs where power consumption holds a priority over instruction throughput. In this embodiment, decoded uops may be output to the execution unit at the same time, regardless of whether they are found in the UOP cache 310 or the instruction cache 320. If found in the UOP cache 310, a hit/miss output from the lookup unit 350 may disable the instruction synchronizer 330, instruction decoder 340 and, optionally, portions of the instruction cache 320 (via a connection not shown). If not, decoded uops may be provided to the execution unit from the instruction cache 320 by way of the instruction synchronizer 330 and instruction decoder 340. Regardless of the path, the decoded uops would be presented to an output multiplexer 380 at the same time.

In an embodiment, the delay element 370 may be a multi-cycle delay element such as a cascaded series of latches.

In the embodiment of FIG. 4, provision of a delay path 370 within the UOP cache 310 may achieve additional power conservation over traditional cache designs. Traditionally, a UOP cache is provisioned as a set-associative cache with a plurality of ways. Even though only one way can possibly hold the data, traditional caches output data from every way while a simultaneous tag match is attempted. For any way where the tag match fails, the data is prevented from propagating out of the cache. This design consumes considerable power.

In the embodiment of FIG. 4, the cache lookup 350 may perform a tag lookup in a first cycle. Even if the tag match registers a hit, data fetching 360 may be delayed until some later clock cycle. In this embodiment, a cache design may ensure that data is read only from the one way that causes the tag match; other ways would be disabled entirely. By disabling non-matching ways from outputting data, further power conservation may be achieved.

Figure 5:
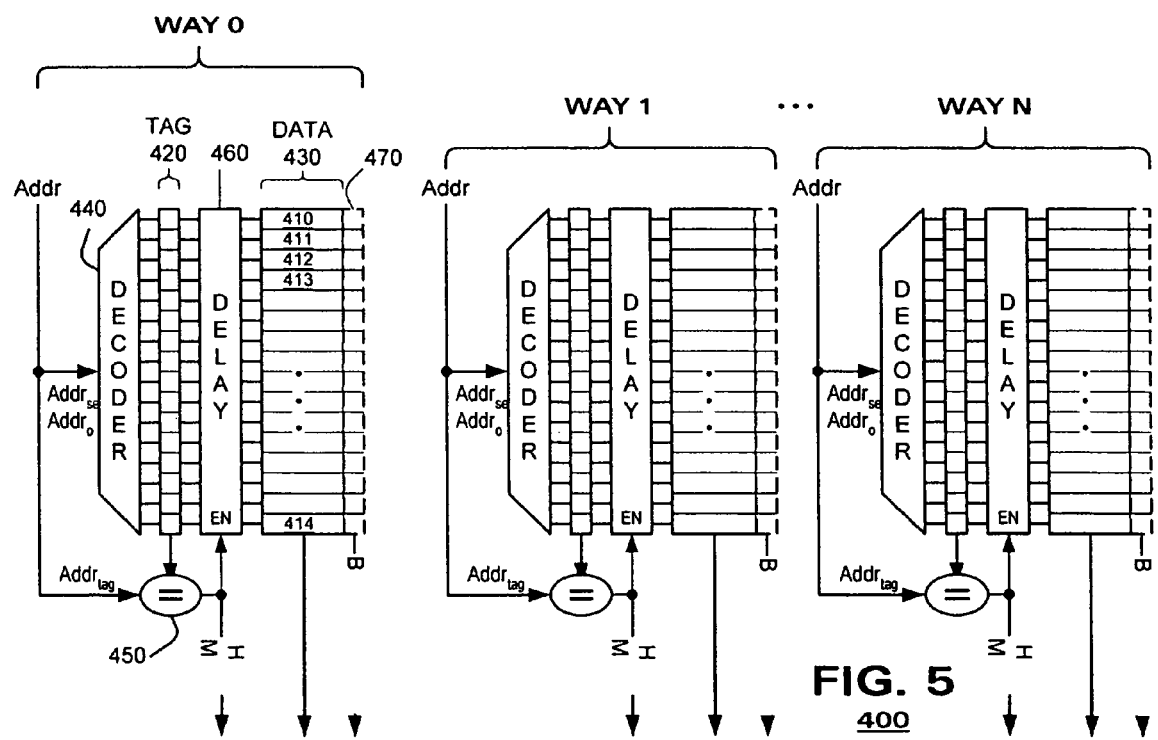
FIG. 5 is a block diagram of a UOP cache 400 according to an embodiment of the present invention.

FIG. 5 is a block diagram of a UOP cache 400 according to an embodiment of the present invention. The UOP cache 400 may be provisioned as a set-associative cache. Accordingly, the cache 400 may include a plurality of ways 0 to N, each having a common architecture. Each way (say, way O) may be populated by a plurality of cache entries 410–414. The entries may include a tag field 420 and a data field 430. Each way also may include an address decoder 440 and a tag comparator 450.

According to an embodiment, the address decoder 440 may be coupled to the cache entries (say, 410) via selection lines. A selection line may be coupled to its respective tag field 420 directly. The selection line may be coupled to its respective data field 430 via a delay element 460.

During operation, an address signal may be applied to an input of the address decoder 440. Based on the address signal, the address decoder 440 may generate an excitation signal on one of the selection lines. The excitation signal may cause data to be read out of the tag field 420 and applied to the tag comparator 450. The tag comparator 450 may determine if the contents of the tag field 420 match a portion of the input address (labeled $Addr_{tag}$). Based on the comparison, the tag comparator 450 may generate a hit/miss signal.

According to an embodiment, the hit/miss signal may be input to the delay element 460. If the tag comparator registers a hit, the delay element 460 may permit the excitation signal from the address decoder 440 to propagate to the data field 430. The excitation signal may cause data to be output from the data field 430 of the respective cache entry 410. This data may be output from the cache 400.

If the tag comparator 450 registers a miss, the delay element 460 may be rendered opaque. The excitation signal would not be permitted to reach the data field 420. No data would be output from the cache.

The foregoing embodiment achieves further power conservation in a UOP cache 400. In traditional caches, when an excitation signal is generated by address decoders of the various ways, data typically is read simultaneously from both the tag fields and data fields in every way of the cache. At most one way should register a hit; the remaining ways register misses. Thus, apparatus typically is provided on the outputs of the data fields which is controlled by the tag comparators. The apparatus prevents data from the non-matching ways from being output from the cache. As can be appreciated, although the simultaneous read from both the tag and data fields can result in a faster access to requested data, it consumes tremendous power because non-responsive data is read from all other ways in the cache. The embodiment of FIG. 4, by contrast, reads from the data field of only one way in the cache 400 by delaying the data read until after a tag match has been registered. Although slower than the traditional cache architectures, the design conserves power.

In an embodiment, the delay element 460 may be tuned for a variety of timing requirements. By way of example, the delay element 460 may be a three-cycle delay element to meet the timing requirements of, for example, the front end system of FIG. 3. The delay element 460 may be tuned for longer or shorter delays depending on the application for which it is to be used.

As discussed above, instruction lengths may vary. UOP lengths typically are constant. When instructions are decoded into uops, however, the number of uops needed to represent the instructions also may vary. Further, there need not be any correspondence between the length of an instruction and the number of uops that represent the instruction. Short instructions may be decoded into a relatively large number of uops and long instructions may be decoded into a single or relatively few uops. A front-end system typically maintains synchronization between instructions and decoded uops.

Figure 6:
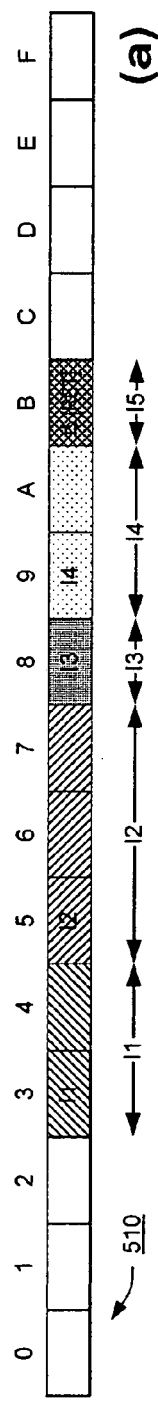
FIG. 6 illustrates synchronization between an instruction cache and a UOP cache according to an embodiment.
Figure 6:
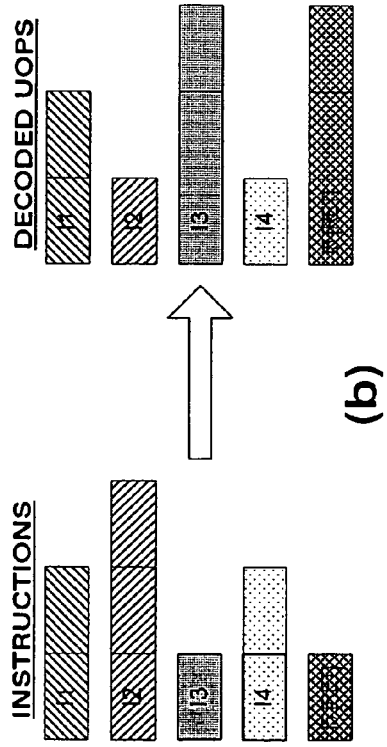
Figure 6:
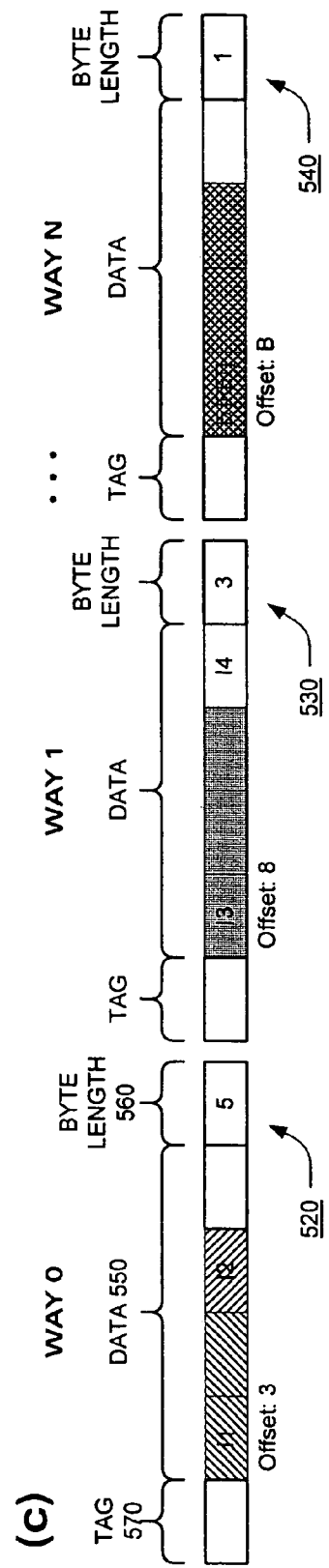

FIG. 6 is a block diagram illustrating an exemplary set of instructions stored in a line 510 of an instruction cache (FIG. 6(a)). In this example, a basic block of four instructions (I1–I4) is stored in the instruction cache. The beginning of the basic block need not be aligned to the first position of the cache line 510. In the example of FIG. 6(a), the basic block begins at a 3-byte offset from the beginning of the line 510. The fourth instruction I4 is illustrated as a jump instruction. It may terminate the basic block. The cache line 510 is shown as having a width of 16 bytes.

FIG. 6(b) illustrates relative sizes of the instructions in FIG. 6(a) and the number of uops corresponding to each instruction following instruction decoding. Table 1 identifies, for each instruction, the length of data occupied by the instruction in the instruction cache and the length of data occupied by the decoded uops in the UOP cache.

TABLE 1

| Instruction | Length of Instruction | No. of UOPs of corresponding Instruction |
|---|---|---|
| $I_1$ | 2 bytes | 2 uops |
| $I_2$ | 3 bytes | 1 uop |
| $I_3$ | 1 byte | 3 uops |
| $I_4$ | 2 bytes | 1 uop |
| $I_5$ | 1 byte | 4 uops |

FIG. 6(c) illustrates exemplary lines 520, 530, 540 of a UOP cache. In this example, the uop-cache line width is shown as four uops (the uops themselves typically have a predetermined byte width, say, twelve bytes). Thus, the seven uops corresponding to the instructions $I_1$–$I_4$ will spread multiple ways of the UOP cache if they are to be stored at all. FIG. 6(c) illustrates the decoded uops for the basic block being stored in three ways of the UOP cache (hypothetically, ways 0, 1 and N).

In an embodiment, lines within the UOP cache 520–540 may store not only the decoded uops but also administrative data representing the offset and byte length of the instructions to which they refer. Line 520 is shown with a data field 550 and a byte length field 560. The data field 550 may store data from the decoded uops. The byte length field 560 may store information representing the length of the instructions as they appear in the line 510 of the instruction cache. Offset information may be stored within the tag field 570 of a cache entry which, in an embodiment, may be merged with set information for the cache line 510. FIG. 5 also shows $Addr_{tag}$ and $Addr_{off}$ data being input to the tag comparator 450 to refer to this embodiment.

In an embodiment, decoded uops may be stored according to a scheme wherein uops from a particular instruction will be stored in a subject line of the UOP cache only if all uops from a decoded instruction can be stored in the same line. Consider line 520 for example, a line that is four uops wide. To fill line 520 completely, decoded uops for instructions $I_1$ and $I_2$ and a first decoded uop associated with instruction $I_3$ could be stored. In this embodiment, the final uop position in line 520 is left "blank" and the uops for instruction $I_3$ are stored together in the next cache line, line 530.

Line 520 is shown as storing uops for instructions $I_1$ and $I_2$. In this embodiment, the line 520 corresponds to a five byte sequence of instructions in the instruction cache. The byte length field 560 may store data indicating the length of the instructions $I_1$ and $I_2$. The sequence of instructions in the line 520 begins with an offset of "3" from the beginning of the cache line 510 in the instruction cache. This offset value may be stored in the tag field 570 of the UOP cache line 520. The tag field 570 also may store additional tag information used to address the instruction cache.

In this embodiment, with reference to FIG. 5, when an address is applied to the UOP cache, the address decoder 440 may cause the contents of the tag field (tag and offset data) to be output to the tag comparator 450. The tag comparator 450 may determine whether a match occurs between the stored values and an input address. If a match occurs in way 0 (FIG. 6(c)), for example, the contents of the data field and the byte length field may be read from the cache entry 520.

To determine whether to continue to read data from the UOP cache, a next address may be computed from a sum of the previous address (IP) and the byte length read from line 520. This address may be applied to the UOP cache and may cause a hit or a miss. In the example of FIG. 6, a hit may be registered at way 1. This process of reading data from the cache and incrementing the address based on the value of the byte length field may continue until a miss is registered. Once a miss is registered, data may be read from the instruction cache rather than the UOP cache.

Other embodiments permit uops from a single instruction to be distributed over multiple cache lines (e.g., lines 520, 530 for instruction $I_3$). Techniques for storing decoded uops in this fashion are well-known but may require flags to identify that an instruction spans across two ways and pointers to identify a ways that stores the remaining uops for the instruction. As is known, such techniques imply the use of more complicated (and, therefore, more "power-hungry") circuitry to interpret this additional administrative data. A choice among the different embodiments may be determined by a balance of performance against power consumption and, therefore, may be selected to suit individual design needs.

The foregoing embodiments have been described as operating on a "basic block" architecture, a known architecture for instruction segments that possesses a single-entry, single-exit structure. Typically, a basic block is a sequence of consecutive instructions, organized according to program flow. The basic block terminates at a control flow instruction (a conditional or unconditional branch, a call, a return), a complex instruction or a predetermined maximum length. The jump instruction $I_4$ illustrated in FIG. 6(c) would terminate the basic block. In an alternate embodiment, the present invention may operate on other blocks, such as a complex block. A complex block may be formed by "promoting" a conditional branch—treating it as "untaken"—and including following instructions as part of the block. In this embodiment, the return instruction $I_5$ could be included in the complex block. References herein to "blocks" are deemed to refer to these different structures. The principles and operation of the foregoing embodiments need not be altered to accommodate for this embodiment.

Figure 7:
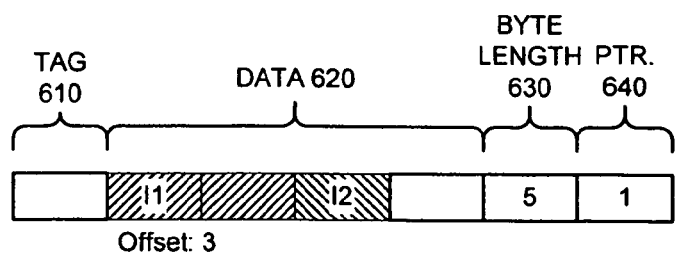
FIG. 7 is a block diagram of a cache line according to an embodiment of the present invention.

FIG. 7 is a block diagram of a line 600 of a UOP cache according to another embodiment of the present invention. In this embodiment, the line may include a tag field 610, a data field 620, a byte length field 630 and a pointer field 640. As in the previous embodiment, the tag field 610 may store data representing a tag and an offset that identifies the uop data stored in the data field 620. The byte length field 630 may store data that represents the length of instructions from the instruction cache 510 (FIG. 6) to which the UOP correspond.

The pointer field 640 may store a pointer that identifies a way in which subsequent uops may be found. Continuing with the example of FIG. 6, if uops from instructions $I_1$ and $I_2$ are stored in the line 600 (in way 0) and the next uops in program order, those corresponding to instruction $I_3$, are stored in way 1, the pointer field 640 may store data identifying way 1. This administrative information permits a UOP cache to perform a tag match only in the identified way (way 1) and to disable tag matching in all other ways of the cache. Additional power conservation may be achieved in this embodiment because it conserves power that would otherwise be consumed when performing a tag lookup globally in every way of the UOP cache.

During operation, when data is retrieved from way 0, a state machine within the UOP cache may identify from data within the pointer 640 which way (way 1) is likely to hold data of the next uops to be retrieved. Of course, due to data eviction within the UOP cache for example, it is possible that the uops stored in way 1 actually do not follow the uops retrieved from way 0. Accordingly, the UOP cache may perform a tag match upon the data stored in the tag field of way 1 and a new address obtained from a sum of the byte length field 630 and the tag data used to access way 0. If the tag match indicates a hit, data from way 1 may be retrieved and forwarded for execution.

Figure 8:
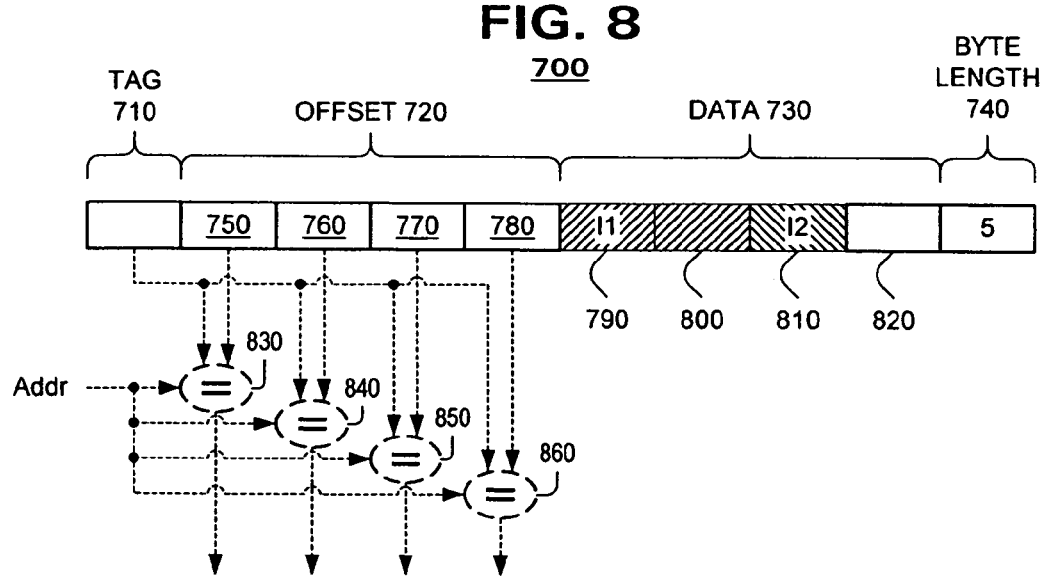
FIG. 8 is a block diagram of a cache line according to another embodiment of the present invention.

FIG. 8 is a block diagram of a line 700 of a UOP cache according to another embodiment of the present invention. In this embodiment, the line 700 may include a tag field 710, an offset field 720, a data field 730 and a byte length field 740. In this embodiment, the offset field may store a plurality of offsets 750–780 one for each uop position 790–820 in the line 700.

The embodiment of FIG. 8 permits a UOP cache to support access of uops in the interior of a cache line 700. For example, some instruction (say, instruction $I_n$) in program flow may cause a jump to instruction $I_2$, an offset of 5 bytes from the beginning of the instruction cache line 510 (FIG. 6). As shown in the example of FIG. 8, the instruction $I_n$ would cause a jump into the interior of line 700, provided the UOP cache can recognize that line 700 stores instruction $I_2$. The embodiment of FIG. 8 provides such functionality.

A cache lookup upon the embodiment of FIG. 8 may include a tag comparator 830–860 corresponding to each offset sub-field 750–780 in the line 700. The tag comparators 830–860 also may be coupled to the tag field 710 of the line 700. Thus, during operation, when a cache lookup is performed using a new address, the new address may be compared to all offsets stored for the line 700. If any one of the tag comparators registers a hit, the new address hits the line 700. Identification of the tag comparator (say, comparator 850) that causes a hit may lead to an identification of the uop position (position 810) from which responsive uops may be retrieved.

The embodiment of FIG. 8 provides for enhanced functionality over other embodiments described above but at a cost of increased power consumption. A decision of whether to implement the embodiment may be made according to design considerations for the application in which the embodiment may be used.

In the foregoing embodiments, various embodiments have described tag and offset data as being either merged into a unitary field or as distributed in multiple fields of a cache line. The principles of the present invention may be applied in either way. For example, although the cache lines 520, 600 of FIGS. 6 and 7 illustrate a single tag field as storing both tag and offset data, such data may be stored in discrete fields in another embodiment. Additionally, although FIG. 8 illustrates a single tag field 710 and multiple offset sub-fields 750–780, such data may be merged as may be desired. For example, the tag data may be duplicated and stored in each sub-field position 750–780 merged with the respective offset data. Such modifications are fully within the spirit and scope of the present invention.

During operation, a front-end system may operate in multiple modes. A "stream" mode occurs when the UOP cache outputs blocks of uops for execution because IPs hit the cache. A "build" mode may occur when instructions must be furnished from the instruction cache (or some other member of the cache hierarchy) because an IP misses the UOP cache. Traditional front-end systems include a block builder 180 (FIG. 2), that observes decoded uops output from the instruction decoder and build blocks for storage in the UOP cache. In this way, if program flow returns to the IP that caused the miss at the UOP cache, the IP will cause a hit instead. In this regard, the operation of front-end systems is well known.

According to an embodiment, when uops of a new block are to be stored in lines 520–540 of a the UOP cache, certain conditions may cause storage of the uops to advance from one line to the next line (say, from line 520 to line 530). In the embodiment of FIG. 6, these conditions may include:

1. a determination that the uops of an instruction (say, $I_3$) cannot all fit within a current line 520;
2. after cache response to new addresses (IPs) switches from a hit to a miss (i.e., the front end system enters a block building mode); and
3. a determination that a previously stored uop is the last in a current block (i.e., a block end condition occurs).

Of course, different conditions may apply to different embodiments. In the embodiment of FIG. 7, for example, it may be appropriate to permit different uops from the same instruction ($I_3$) to be stored in different cache lines because the cache pointer may identify the next line that is likely to hold the remaining uops to the instruction. In this embodiment, condition no. 1 above may be replaced by a different condition, simply a determination that a current line 520 is full.

Several embodiments of the present invention are specifically illustrated and described herein. However, it will be appreciated that modifications and variations of the present invention are covered by the above teachings and within the purview of the appended claims without departing from the spirit and intended scope of the invention.

We claim:

1. A cache comprising a plurality of cache lines, each cache line having fields to store tag data, offset data, a plurality of micro-instructions, and byte-length data, the offset data and the byte-length data to refer to source data in another cache.

2. The cache of claim 1, wherein the offset field is to store data representing an offset of a source instructions, corresponding to a first micro-instruction of said plurality of micro-instructions, from the beginning of a cache line in said another cache in which the source instruction is stored.

3. The cache of claim 1, wherein the byte-length data represents a byte length of source instructions in said another cache to which the plurality of micro-instructions correspond.

4. The cache of claim 1, the cache having a plurality of ways, a cache line of said plurality of cache lines further comprising a field to store a next line pointer, indicating another way in the cache in which subsequent micro-instructions are likely to be found.

5. The cache of claim 1, wherein the field to store offset data comprises a plurality of offset sub-fields, each sub-field corresponding to a micro-instruction position in the respective cache line.

6. The cache of claim 5, further comprising:

a cache lookup unit comprising a plurality of comparators, a respective comparator corresponding to each of the offset sub-fields, each comparator having a first input coupled to the respective offset sub-field and having a second input for address data, each comparator to compare offset data with the address data.

7. The cache of claim 6, wherein each cache line includes a single field to store tag data, the field to store tag data being coupled to the first input of each of the comparators, each comparator to compare the tag data and the offset data with the address data.

8. The cache of claim 6, further comprising a data fetch unit to output data, responsive to the comparison of offset data with address data, from the micro-instruction position corresponding to the offset sub-field matching the address data.

9. The cache of claim 4, each of the ways comprising a cache lookup unit to perform a tag match based on tag data stored in the cache lines of the respective way, wherein the field to store the next line pointer is to disable the cache lookup unit of each of the plurality of ways other than said another way indicated by the next line pointer if said subsequent micro-instructions are retrieved.

* * * * *